US012306916B2

(12) United States Patent
Garriga Calleja et al.

(10) Patent No.: US 12,306,916 B2
(45) Date of Patent: May 20, 2025

(54) VALIDATING A USER USING A DIGITAL BEHAVIORAL FINGERPRINT GENERATED WITH SENSOR DATA FROM THE USER'S PORTABLE DEVICE

(71) Applicant: KOA HEALTH DIGITAL SOLUTIONS S.L.U., Barcelona (ES)

(72) Inventors: Roger Garriga Calleja, Barcelona (ES); Aleksandar Matic, Lloret de Mar (ES); Johan Lantz, Barcelona (ES)

(73) Assignee: KOA HEALTH DIGITAL SOLUTIONS S.L.U., Barcelona (ES)

( * ) Notice: Subject to any disclaimer, the term of this patent is extended or adjusted under 35 U.S.C. 154(b) by 209 days.

(21) Appl. No.: 17/537,970

(22) Filed: Nov. 30, 2021

(65) Prior Publication Data

US 2022/0092158 A1    Mar. 24, 2022

Related U.S. Application Data

(63) Continuation-in-part of application No. PCT/EP2020/087705, filed on Dec. 22, 2020.

(30) Foreign Application Priority Data

Dec. 26, 2019   (EP) ..................... 19383198

(51) Int. Cl.
   *G06F 21/00*  (2013.01)
   *G06F 21/31*  (2013.01)
(52) U.S. Cl.
   CPC .................. *G06F 21/316* (2013.01)
(58) Field of Classification Search
   CPC . G06F 21/316; G06F 2221/2111; G06F 21/32
   See application file for complete search history.

(56) References Cited

U.S. PATENT DOCUMENTS 9,256,748 B1    2/2016  Gates et al. .......... G06F 21/316
2012/0167170 A1*  6/2012  Shi ....................... G06F 21/316
                                                        726/2

(Continued)

FOREIGN PATENT DOCUMENTS

EP          2733635 A2    11/2013
WO      WO2015/127256     2/2015

OTHER PUBLICATIONS

International Search Report dated Feb. 1, 2021, from the European Patent Office in the priority International Patent Application PCT/EP2020/087705 (3 pages).

*Primary Examiner* — Jeffrey C Pwu
*Assistant Examiner* — Helai Salehi
(74) *Attorney, Agent, or Firm* — MARSHALL, GERSTEIN & BORUN LLP (57) ABSTRACT

A user is validated using first data from sensors on the user's portable device and second data input by the user. The user's digital behavioral fingerprint is generated using the first data. Whether the user's purported identity is authentic is determined by computing an authenticity score using the fingerprint. The user's identity is authentic if the authenticity score is less than a first threshold and potentially not authentic if greater than the first threshold. If potentially not authentic, whether the second data is invalid is determined using a conformity score that compares the second data to prior data of the user and data associated with others. The second data is not invalid if the conformity score is less than a second threshold, but invalid if greater than the second threshold. Access to a service is granted if either the user's identity is authentic or the second data is not invalid.

18 Claims, 5 Drawing Sheets

(56) References Cited

U.S. PATENT DOCUMENTS

2013/0055370 A1    2/2013   Goldberg et al. ..... G06F 21/316
                                                              726/7
2017/0289168 A1*  10/2017   Bar ................... H04L 63/1408

* cited by examiner

VALIDATING A USER USING A DIGITAL BEHAVIORAL FINGERPRINT GENERATED WITH SENSOR DATA FROM THE USER'S PORTABLE DEVICE

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2020/087705, filed on Dec. 22, 2020, and published as WO 2021/130272 A1 on Jun. 1, 2021, which in turn claims priority from European Application No. EP 19383198.9, filed in the European Patent Office on Dec. 26, 2019. This application is a continuation-in-part of International Application No. PCT/EP2020/087705, which is a continuation of European Application No. EP 19383198.9. International Application No. PCT/EP2020/087705 is pending as of the filing date of this application, and the United States is an elected state in International Application No. PCT/EP2020/087705. This application claims the benefit under 35 U.S.C. § 119 from European Application No. EP 19383198.9. The disclosure of each of the foregoing documents is incorporated herein by reference.

TECHNICAL FIELD

The present invention is directed to a method, system and computer programs for validating a user. The invention uses both passive and active collected data, and using these inputs builds a user profile and a digital phenotype of the user and tracks it over time in order to tailor offers and services or provide a personalized experience.

BACKGROUND

Smartphone applications frequently rely on collecting data from users in order to deliver services or to personalize the user experience. This includes data that can be both passively and actively collected.

One particular domain where smartphone based digital phenotyping promises radical improvements involves mental wellbeing applications, due to the fact that smartphones and/or smartwatches allow for unobtrusive (passive) behavioral monitoring through sensors or active user inputs, given that they are carried out anytime and anywhere. A prominent use-case is delivering a psychotherapy program (e.g., Cognitive Behavioral Therapy) typically delivered in-person by a therapist. But now there are a number of companies that build applications in the form of a mobile app to help people with clinical or subclinical symptoms.

Especially for mental health applications (as well as for a lot of other kinds of commercial applications) it is critical to validate the collected data used to deliver the service, which is a domain that has not been addressed properly. This refers both to passive and active data. Passive data should not be considered valid if a different person is using the phone in a specific period of time or, for instance, if the phone is purposefully left aside in order not to collect the data. Active data should not be considered valid if a person does not provide genuine inputs, e.g., answers to surveys or questionnaires (typically in the user modeling literature referred to as "ground-truth"). For this reason, to validate the collected data there is an important need to detect:

1. If the user registered for the service is in control of the device at all time or not (which can result in passively collected data being skewed).
2. If the user is providing self-reports in a non-genuine way. This could, for instance, come from the fact that a self-report was submitted in a rush, e.g., while being in a meeting or doing something else, or the user/patient had reasons for intentionally providing incorrect information (e.g., to manipulate the therapy program, or the insurance company, or his/her therapist who has access to his/her data through the app). Lastly, the reason for self-reporting in a non-genuine way might come from a misperception of the patient's current status, which refers to the common drawback of self-reports as they are a very subjective tool for measuring symptoms, feelings, and mental states.

For this reason, an object of present invention is to provide a trustful and reliable architecture that relies on the data that is validated.

SUMMARY

A method, system and computer programs for validating a user, as well as data received from the user, are provided. The method comprises receiving first and second data about a user; computing a digital behavioral fingerprint by processing the received first data; executing a first authentication step of an identity of the user by computing an authenticity score using the computed digital behavioral fingerprint, wherein if the authenticity score is equal or below a first threshold the identity of the user is established as valid; checking the validity of the received second data by computing a conformity score, wherein if the conformity score is equal or below to a second threshold the received second data is established as valid; providing a recommendation to the user by correlating the first and second data only if the identity of the user and the second data have been established as valid.

A method for validating a user uses a digital behavioral fingerprint to authenticate a purported identity of the user. First data associated with the user is passively acquired by sensors on a portable computer device of the user. The first data is acquired during a plurality of predetermined time intervals. Second data associated with the user is actively input by the user into the portable computer device. A digital behavioral fingerprint of the user is generated by processing the first data. Whether a purported identity of the user is authentic is determined by computing an authenticity score using the digital behavioral fingerprint. The purported identity of the user is determined to be authentic if the authenticity score is less than or equal to a first threshold of identity. The purported identity of the user is determined to be potentially not authentic if the authenticity score is greater than the first threshold of identity.

If the purported identity of the user is determined to be potentially not authentic, it is determined whether the second data associated with the user is invalid by computing a conformity score. The conformity score is based on a difference between the received second data and an expected second data. The expected second data is based on prior second data associate with the user that was received prior to the plurality of predetermined time intervals and on second data associated with other users. The second data associated with the user is determined to be not invalid if the conformity score is less than or equal to a second threshold of identity, whereas the second data associated with the user is determined to be invalid if the conformity score is greater than the second threshold of identity. The user is allowed access to a service if either the purported identity of the user is determined to be authentic or the second data associated with the user is determined to be not invalid In one embodiment, the service is providing a cognitive behavioral therapy treatment to the user. The first data associated with the user includes any of the following: data regarding movement acquired by an accelerometer of the portable computer device of the user, data about when a screen of the portable computer device was on and off, data about when the portable computer device was locked and unlocked, data describing finger swiping patterns on the portable computer device, data about when a mobile app installed on the portable computer device was used, data on sleep characteristics of the user, and data describing background noise sensed by the portable computer device. The digital behavioral fingerprint relates to any of the following: a gait pattern of the user, a typical route traveled by the user, a typical routine undertaken by the user, and a regular sleep pattern of the user.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

To that end, the present invention proposes, according to one aspect, a user's validation method, comprising receiving, by a computer, every certain period of time, first data about a user, wherein the first data is passively collected by one or more sensors of at least one portable computer device of the user or from user usage events of the at least one portable computer device; receiving, by the computer, second data about the user, wherein the second data is actively collected via a computer device of the user; computing, by the computer, a digital behavioral fingerprint of the user by processing the received first data; executing, by the computer, a first authentication step of an identity of the user by computing the user's authenticity score using the computed digital behavioral fingerprint, wherein if the user's authenticity score is equal to or below a first threshold the identity of the user is established as valid, otherwise the computer establishes that a second authentication step has to be executed; checking, by the computer, the validity of the received second data by computing a user's conformity score, the latter being computed as the difference between an expected second data and the received second data, the expected second data being based on both second data of other users and previous second data of the user, wherein if the user's conformity score is equal to or below a second threshold the received second data is established as valid, otherwise the computer establishes that the received second data is incorrect; and providing, by the computer, a personalized service or recommendation to the user by correlating the received first data with the received second data only if the identity of the user and the second data have been established as valid.

It should be noted that even though in the above-described embodiment both the authenticity and conformity score are considered as a distance measure (i.e., they have to be below the first/second threshold in order to say that the user/second data is valid (smaller distance)), the method is not constrained to distance. As an alternative embodiment, the likelihood of the distribution could be used to measure the agreement between the expected and the first/second data received (this holds for both the authenticity and the conformity score). In this case, the bigger the likelihood the closer the expected and the observed data are, so then the "above" would have been used instead of below, or the negative likelihood would have been used instead, and the "below" always would be kept.

According to the invention, the second data or active data includes direct inputs from users, for instance to rate an experience of visiting a restaurant/museum/shop, answer to a mental health questionnaire (such as PHQ-9 for depression) or filling out the form in a banking App, etc.

The portable computer device can be any of a smartphone, a smartwatch, a smart scale, a blood pressure sensor and/or a temperature sensor.

In one or some embodiments, the first data may comprise speed data collected by an accelerometer of the portable computer device, and the computed digital behavioral fingerprint may comprise information about gait patterns of the user. Alternatively or complementarily, the user usage events may comprise: data about when a screen of the portable computer device was on/off, data about unlocks of the portable computer device, swiping patterns on the portable computer device and/or data about when one or more software applications installed on the portable computer device were used, and wherein the computed digital behavioral fingerprint comprises a deviation score of a typical routine of the user. Alternatively or complementarily, the first data may comprise data collected by an accelerometer of the portable computer device and user usage events, and the computed digital behavioral fingerprint may comprise movement information of the user with regard to specific actions performed by the user on the portable computer device. Alternatively or complementarily, the user usage events may comprise swiping patterns on the portable computer device, and the computed digital behavioral fingerprint may comprise a deviation score of a regular pattern of the user. Alternatively or complementarily, the first data may comprise the user's sleep characteristics, and the computed digital behavioral fingerprint may comprise a deviation score of a regular sleep pattern of the user. Alternatively or complementarily, the first data may comprise audio or noise features of the user, and the computed digital behavioral fingerprint may comprise information regarding the user's mood.

In an embodiment, the first authentication step further comprises computing, by the computer, a new digital behavioral fingerprint of the user by processing new first data received during a certain time, and computing, by the computer, a new user's authenticity score between the digital behavioral fingerprint and the new digital behavioral fingerprint. In this case, three different situations may arise:
1) if the new user's authenticity score is equal to or less than a given threshold A, the identity of the user is established as valid, and the computed digital behavioral fingerprint is auto-calibrated with the new digital behavioral fingerprint;
2) if the new user's authenticity score is greater than the given threshold A and less than a given threshold B, the second authentication step is triggered, wherein if the identity of the user is established as valid in the second authentication step, the computed digital behavioral fingerprint is recalibrated with the new digital behavioral fingerprint;
3) otherwise, the new digital behavioral fingerprint is discarded if any of the following happen: the new user's authenticity score is greater than the given threshold B and the second authentication step is triggered and the identity of the user is established as invalid in the second authentication step.

In an embodiment, the first data is passively collected at different time intervals by a plurality of sensors of the portable computer device (e.g., GPS, one or more accelerometers, light sensor, etc.). The method in this case stores each first data received as an independent record in a database. In one or some embodiments, said independent records are also stored associated to a timestamp. The novel method can then recalibrate the computed digital behavioral fingerprint using only the most recent records, such as those records having a timestamp comprised in a given time interval, for example 12 h, 24 h, five days and/or seven days from a current time, depending on the type of user and/or received data. In another embodiment, a novel system includes a user's validation system, which includes a portable computer device of the user having one or more sensors; a computer device of the user; and a computer including at least one memory and at least one processor. According to the novel system, the processor is configured to: receive, every certain period time, first data about a user, wherein the first data is passively collected by the one or more sensors of the at least one portable computer device or from user usage events of the at least one portable computer device; receive second data about the user, wherein the second data is actively collected via the computer device of the user; compute a digital behavioral fingerprint of the user by processing the received first data; execute a first authentication step of an identity of the user by computing a user's authenticity score using the computed digital behavioral fingerprint, wherein if the user's authenticity score is equal to or less than a first threshold the identity of the user is established as valid, otherwise the computer establishes that a second authentication step has to be executed; check the validity of the received second data by computing a user's conformity score, the latter being computed as the difference between an expected second data and the received second data, the expected second data being based on both second data of other users and previous second data of the user, wherein if the user's conformity score is different than a second threshold the received second data is established as valid, otherwise the computer establishes that the received second data is incorrect; and provide a personalized service or recommendation to the user by correlating the received first data with the received second data only if the identity of the user and the second data have been established as valid.

The portable computer device may be any of: a smartphone, a smartwatch, a smart scale, a blood pressure sensor and/or a temperature sensor. In one embodiment, the computer device of the user is a PC or a tablet.

In some embodiments, the portable computer device and the computer device of the user can be the same, for example both devices can be a smartphone.

Other embodiments that are disclosed herein also include software programs to perform the method steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

A method and system are disclosed for detecting a set of key parameters that will authenticate a user by passive means and detect anomalies in usage patterns over periods of time. The system combines these methods into an assessment of how authentic the user data is based on the correspondence between the user's self-assessment and the assessment provided by the novel method.

The invention guarantees that the user is authentic and also cross-correlates self-reported status with the status generated by passively collected sensor data from a smart device of the user.

Figure 1:
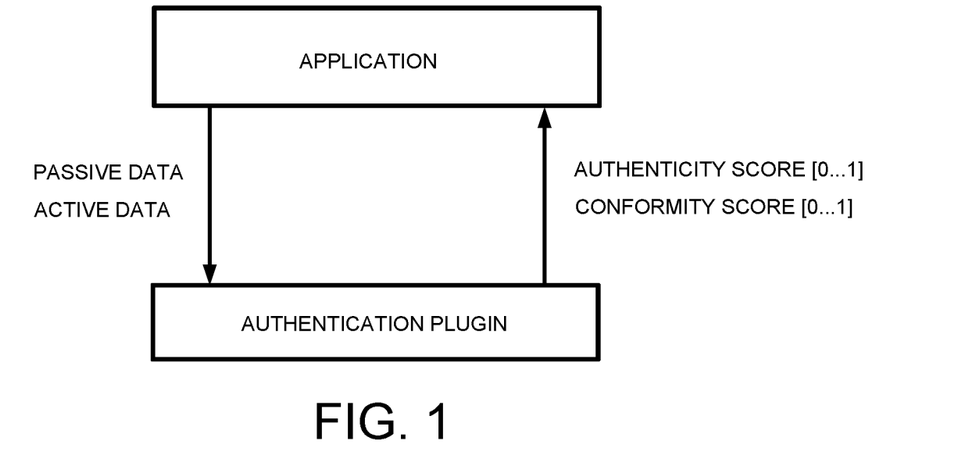
FIG. 1 generally illustrates an embodiment of the present invention to validate a user.

This disclosure describes a method and corresponding system for validating a user. The system can be implemented as a "plugin" to any application that has a requirement to verify the authenticity of the user and its inputs. As shown in FIG. 1, the novel method provides two main services: validation of passive data and validation of active data. Once the passive data and the active data have been correctly validated, a personalized service or recommendation to the user can be provided.

To validate the passive data, the novel method performs an automatic user authentication with gradual adaptation based on digital behavioral fingerprinting mainly using passive sensor data. In addition, the method may provide occasional "hard" authentication prompts in scenarios where larger than expected deviations from the typical user behavior are detected. The authentication system adapts the digital behavioral fingerprint continuously to small changes in the behavior of the user while reassuring the authenticity of the user, thus moving away from a static biometric authentication towards a mostly unobtrusive but reliable system. The existing approaches in biometric and behavioral authentication do not automatically capture digital behavioral fingerprint changes over time and therefore can result in a higher rate of false positive alarms.

With regard to the active data validation, in many smartphone applications (particularly those providing mental health interventions), the user is expected to provide occasional or regular inputs, e.g., about mental health symptoms or feelings (e.g., reporting on the question "How are you feeling today?"). This can be prompted at an appropriate time in order to label sensor data with a mood or to gather more specific parameters such as the progress in the mental health symptoms or in the subjective wellbeing (SWB) as a result of a phone delivered exercise/program/part of or a full cognitive behavioral therapy (CBT) treatment. In these scenarios, the novel method provides a conformity score that is compared to the self-reported value in order to detect whether the user is (knowingly or unknowingly) providing an answer having a limited reliability.

Thus, the novel method is a tool, for instance, for a therapist to verify how well a treatment is working, not only based on what the user is subjectively reporting but also by automatically detecting progress while, importantly, ensuring the identity of the user, i.e., that he or she is really the registered user undertaking the treatment and not another person. As used in this disclosure, "digital factors" denotes a set of values resulting from the aggregation of digital signals during a certain period of time. Each of the digital factors represents a component of the behavior of the user during a time-frame. Each of the digital factors can be different at different periods of time, but in combination they are close to each other. The combination of digital factors over time expresses the long-term behavior of the user.

As used in this disclosure, "digital behavioral fingerprint" denotes a set of digital factors captured over a large enough period of time that uniquely identify a user digitally. The digital behavioral fingerprint is represented by a set of values that summarize the behavior of the user at a specific time-frame. Given a new period of time with the corresponding digital factors, the digital fingerprint is a sufficient representation of the user that allows the system to evaluate whether the digital factors came from the user or not. The digital fingerprint evolves over time with the change in the behavior of the user.

An authenticity score is a score that evaluates the likelihood that some digital factors represent the behavior of a user during a specific period of time according to the user's digital behavioral fingerprint. The authenticity score is a soft threshold used to determine whether the digital factors and the digital behavioral fingerprint belong to the same user or whether there is a need for second level authentication. A hard threshold is used to determine whether the digital factors and the digital behavioral fingerprint can belong to the same user, or the system must signal an authentication failure. A conformity score is a score that evaluates the agreement between the self-reported inputs (or active data) and the digitally expressed behavior of the user. The conformity score uses a set of digital factors specific to the self-reported measure and evaluates how far the self-reported measure is from its expected value according to the digital factors.

Figure 2:
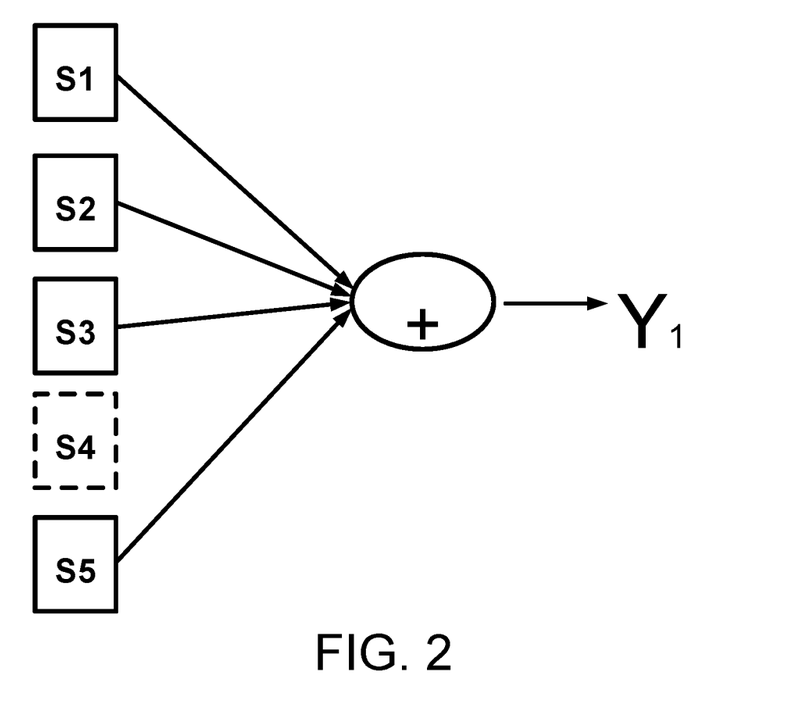
FIG. 2 illustrates an example in which various sensors are used to provide an input to the proposed method.

A first component of the novel system is responsible for collecting a set of sensor data and/or user events from the user's portable device(s), e.g., a smartphone, a smartwatch, a smart scale, a blood pressure sensor and/or a temperature sensor. The information is sent to a computer including at least one memory and one or more processing units for processing. Alternatively, the information collected can be processed on the same device to collect the data, such as in scenarios with strict data protection limitations. The system uses information from a multi-modal sensor and/or phone usage logs that constitute behavioral fingerprint used for authentication. FIG. 2 shows a simplified illustration in which a sensor S4 is not available on the portable computer device of the user so that only the input from S1, S2, S3 and S5 sensors is used by the novel method to provide the prediction of the ☐ values, here representing the authenticity score and self-reporting conformity score.

The details are described below of various examples of sensors and/or usage events that can be used by the method to deliver authentication based on behavioral patterns, as well as to capture relevant signals.

Gait patterns: An accelerometer sensor can be used to detect the gait patterns (i.e., walking style) of the user who is carrying the portable computer device. This biometric can be measured by a set of features extracted from the accelerometer that describe the walking style of the user, which is considered to be an individual characteristic that can be used for authentication. However, using this method alone has certain limitations as the gait patterns captured through accelerometer can vary depending on the place where the portable computer device is carried on (e.g., pocket, hand, bag, etc.). A higher accuracy in automatic authentication is expected when combined with the other data streams.

App and phone usage patterns: The patterns of the phone usage as well as the use of specific Apps vary from user to user. Individuals typically exhibit specific daily patterns of using Apps and in general their phones (e.g., first morning usage, while commuting, etc.). By detecting deviations from the typical routines, the system may detect that the sensor information is not from the same user. Similarly to gait pattern, this data source in isolation might not be able to provide a reliable authentication system, but it is valuable in addition to the other data sources.

Accelerometer readings when holding the phone: The accelerometer can be used to capture "micro" movements while a person is holding the smartphone, as well as heart rate and respiratory rate. The system can unobtrusively collect accelerometer readings in different situations such as: Picking up the smartphone from its stationary position, when in a phone call, static while holding the smartphone, etc. and use the processed readings to extract features relevant for authenticating the identity of a user.

Movement and phone use patterns: Patterns of movement and of smartphone use can be used for authentication, but equally important at impacting the data collection is to detect the "non-expected" absence of movement, such as in cases when the user intentionally leaves the phone stationary.

Swiping patterns: Trajectories of pixel activations when the user's fingers move across the screen, such as when swiping or scrolling to use App functions can also be used to build a user model of "normal" patterns and then to detect deviations from such patterns.

Mobility and activity patterns: Most people have regular habits, commuting from home to work, exercising at specific times, walking, using a bike, and so on. Large deviations from these patterns might indicate that the sensor information is not from the same user anymore or might signal important changes in behavior.

Sleep patterns: Most people have similar sleep cycles over extended periods of time. Deviations in sleep patterns might indicate either problems or improvements in mental status.

Audio/Video sentiment analysis: If the proposed system offers audio recording features, for instance through voice or video diaries, then these recordings can be analyzed in order to infer current sentiments that will be used as another sensor data input.

It should be noted that all of the above-mentioned signals and sensor data have a two-fold purpose: 1) to provide a passive automatic user authentication with automatic digital behavioral fingerprint updates (referred to as auto-calibration and recalibration), 2) to analyze behavioral patterns to juxtapose them with self reports for validating how reliable user inputs are.

This disclosure describes a method and system that use the combination of different digital signals extracted from passive data to confirm the identity of a user and to provide an authentication system. Using this framework, the system builds an array of values output as a result of processing the passive data gathered by the portable computer device of the user. Those values form the digital factors, consisting of aggregates of the passive data over a certain period of time. The authentication system requires the data of the user for a certain time frame in order to understand the digital factors that identify the individual. Once the personal authentication algorithm is in place, the array of values forms the digital behavioral fingerprint of the user and by computing the digital factors during a shorter timeframe, the system is able to tell whether the person using the device is the purported user or not.

The novel system continuously authenticates the user and detects the moment when it is necessary to ask for a "hard" authentication whenever the authenticity score of the passive authentication system reaches a predetermined threshold of uncertainty. This will happen once the patterns in digital factors have significantly changed from the ones expressed during the digital behavioral fingerprint generation. However, this can also indicate a change (an improvement or degradation) in the mental state of the user due which caused the change in typical behavior. In such cases, if the system confirms the identity of the user, the digital behavioral fingerprint database for the corresponding user is updated for future authentication.

In one embodiment, the following phases of the method are executed in order to compute or generate the digital behavioral fingerprint of the user.

Figure 3:
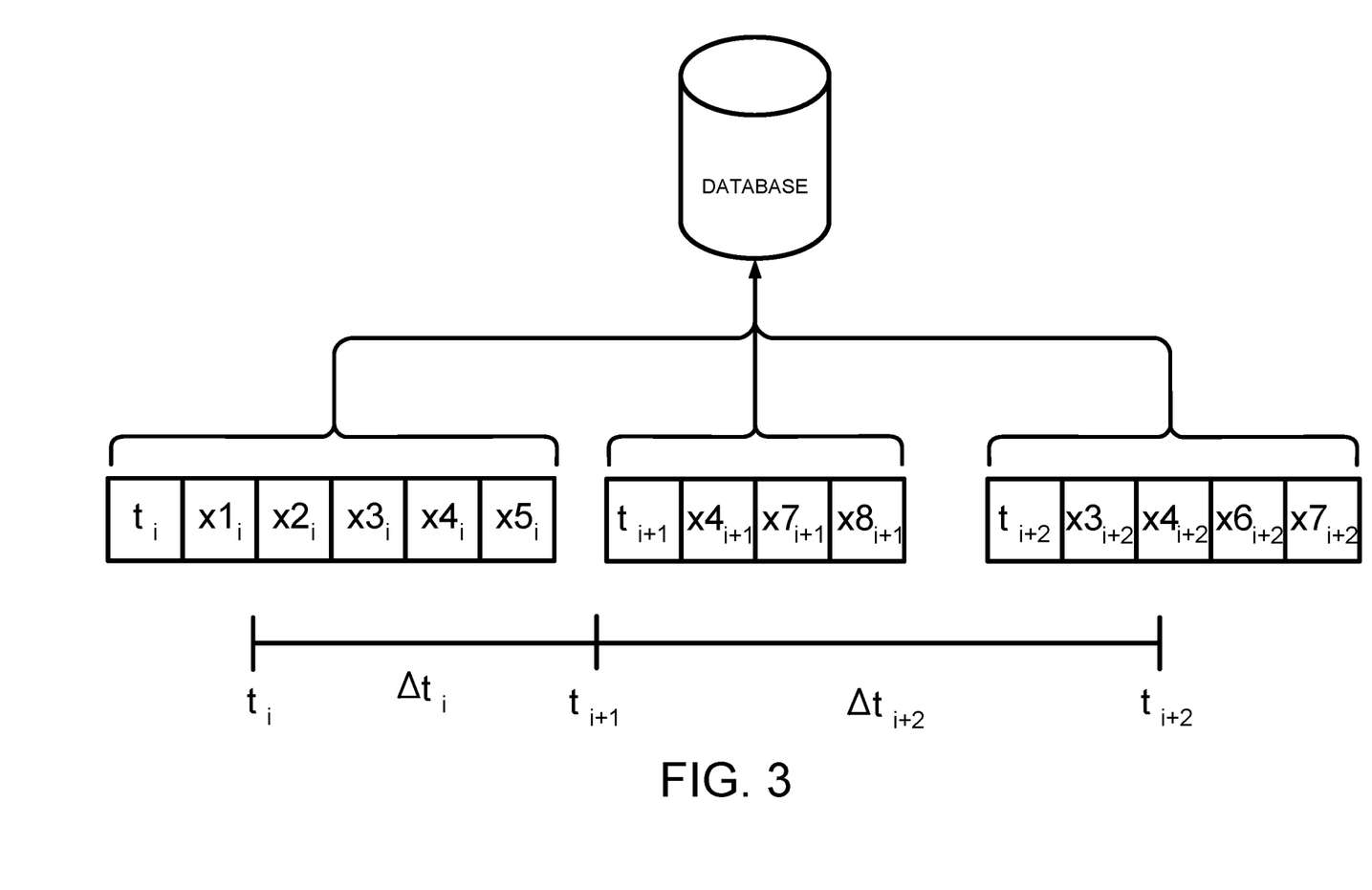
FIG. 3 illustrates an example of how the passive data is captured, stored and processed to compute the digital behavioral fingerprint according to a first embodiment.

First, the passive data from the sensor(s), coming from the portable computer device, such as a smartphone and/or wearable, among others, is captured and stored in a database for it to be processed. FIG. 3 illustrates how this passive data arrives in different sizes and at irregular time intervals. For example, at $t_1$ an accelerometer reading during the previous fifteen seconds arrives, at $t_2$ three minutes later a noise reading arrives with the average level during the previous ten seconds, at $t_3$ five minutes after a location observation with the latitude and longitude of the user is received, etc. The data is collected in the database, and the set of data coming from the user k up to time t forms the historical data of the user denoted as $H_{k,\,t}$.

Figure 4:
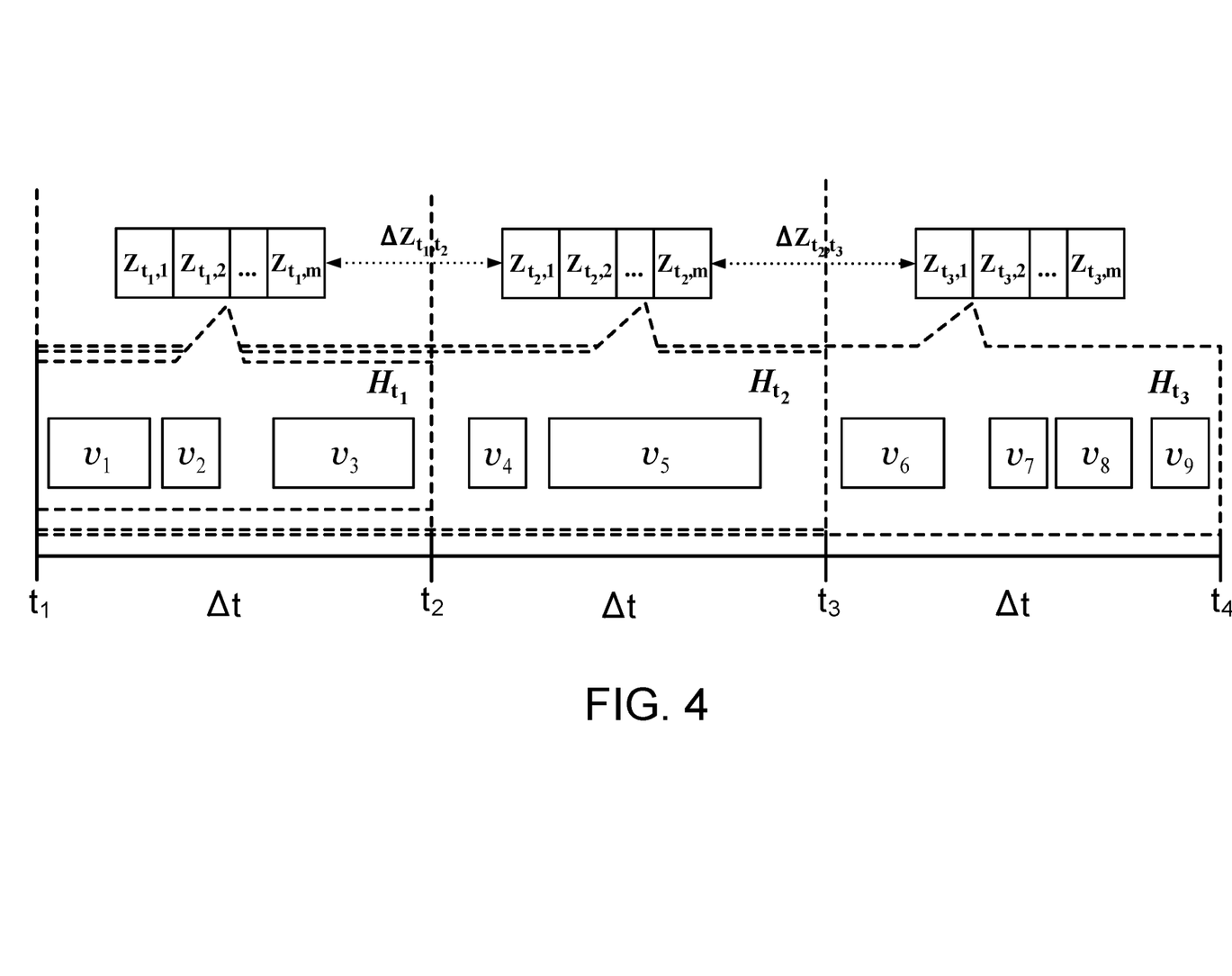
FIG. 4 illustrates an example of how the passive data is captured, stored and processed to compute the digital behavioral fingerprint according to a second embodiment.

Then, the passive data coming from the sensor(s) over time is aggregated to compute/generate the digital behavioral fingerprint. For each user $U_k$ at time t, a set of digital factors $Z_{k,\,t} = \langle z_{k,\,t,\,1}, z_{k,\,t,\,2}, \ldots, z_{k,\,t,\,m} \rangle$ are computed by aggregating the passive data over $H_{k,\,t}$. FIG. 4 shows how the digital behavioral fingerprint is constructed over time. Alternatively, in another embodiment it is possible to define a period of time T and use only a subset of $H_{k,\,t}$ that starts at time t−T and finishes at time t, denoted as $H_{k,\,(t-T,\,t)}$. For example, the novel method can compute the digital behavioral fingerprints over the past 2 months instead of using the whole historical data of the user. The digital behavioral fingerprint computed with $H_{k,\,(t-T,\,t)}$ is denoted as $Z_{k,\,(t-T,\,t)}$.

Individuals can change their behavior over time, leading to a gradual change in the digital behavioral fingerprints. These changes accumulated over time consequently change the set of digital factors and at a certain point go beyond the threshold to signal a failed authentication. For this reason, in an embodiment, the invention uses the most recent historical data, thus the system recalibrates the digital behavioral fingerprint that gradually changes over time in line with the range of changes expected due to the behavioral intervention (e.g., the therapy App). FIG. 4 illustrates how the digital behavioral fingerprint is gradually changed over time. In a very short time frame (such as from one day to the other) changes in the digital factors are not expected to be enough to trigger an authentication alarm, and in these time periods the system would update the digital behavioral fingerprint, assigning the updated digital behavioral fingerprint to the actual user.

The novel method relies on collecting expected digital behavioral fingerprint change trajectories. In this regard, before updating the digital behavioral fingerprint of the user k, the system needs to make sure that 1) the new collected data comes from the expected user and 2) the changes in the digital behavioral fingerprint correspond to the expected digital behavioral fingerprint change trajectories. For every fixed period of time T, the digital factors $Z_{k,\,(t-T,\,t)}$ of the period t−T to t are computed. Then, the system checks how far $Z_{k,\,(t-T,\,t)}$ is to the digital behavioral fingerprint $Z_{k,\,t-T}$ before the period T (i.e., at time t−T). There are three possible cases:

1. The distance between $Z_{k,\,(t-T,\,t)}$ and $Z_{k,\,t-T}$ is equal to or less than a given threshold $D_{soft}$. Then, the user has not had a significant change on the digital factors compared to the digital behavioral fingerprint, and the new digital behavioral fingerprint $Z_{k,\,t}$ is computed as described above.

2. The distance between $Z_{k,\,(t-T,\,t)}$ and $Z_{k,\,t-T}$ is greater than the predetermined threshold $D_{hard}$. Then, there is a great difference in the new digital factors compared to the digital behavioral fingerprint, thus the authentication fails. The person who is using the portable computer device is not the owner.

3. The distance between $Z_{k,\,(t-T,\,t)}$ and $Z_{k,\,t-T}$ is greater than the soft threshold $D_{soft}$ and less than the hard threshold $D_{hard}$. Then, there is a significant difference in the digital factors compared to the digital behavioral fingerprint, but the system is unsure whether it is due to a significant change in behavior or due to a different person using the portable computer device. In this case, a second level authentication (or second authentication step) would be triggered.

Auto-Calibration:

The behavior of the user may change over time, leading to a gradual change in the digital behavioral fingerprint. For this reason, the system recalibrates the digital behavioral fingerprint over time using the most recent historical data. FIG. 4 illustrates the recalibration over time. Before updating the fingerprint of a user k, the system needs to make sure that the newly collected passive data comes from the user. For every fixed period of time T, the digital factors $Z_{k,\,(t-T,\,t)}$ of the period t−T to t are computed. Then, the system checks how far $Z_{k,\,(t-T,\,t)}$ is to the digital behavioral fingerprint $Z_{k,\,t-T}$ before the period T (i.e., at time t−T); this distance is the authenticity score. If the authenticity between $Z_{k,\,(t-T,\,t)}$ and $Z_{k,\,t-T}$ is less than the predetermined threshold $D_{soft}$, then the new fingerprint $Z_{k,\,t}$ is computed. Otherwise, a "hard" authentication is triggered. If the second level authentication passes, the system needs to recalibrate the fingerprint so that subsequent authentications do not fail the same way.

In another embodiment, the digital factors are drawn from a distribution of behavior of the user, which is represented by the digital behavioral fingerprint. Then, for a new set of digital factors, the authenticity score corresponds to the likelihood of the digital factors belonging to the distribution represented by the digital behavioral fingerprint. This authenticity score is compared to the soft and hard thresholds as described above in order to trigger the second level authentication or update the digital behavioral fingerprint. In this case, the update of the digital behavioral fingerprint results in an update of the representation of the user's behavior distribution, e.g., applying a Bayes rule to the previous digital behavioral fingerprint (prior) with the new digital factors (likelihood) to build the new digital behavioral fingerprint (posterior).

Recalibration:

The user can change the user's behavior, which affects the authentication algorithm causing it to falsely signal an authentication alarm. On the other hand, a change of the user using the portable computer device would also result in different behaviors being captured by the system also resulting in the authentication algorithm correctly signaling an authentication alarm. For this reason, it is important for the system to keep updating the authentication while not compromising in "true positives" ratio for detecting the true change in identity of a user. The system constantly quantifies for every fixed period of time T to which extent the digital factors of the period $Z_{k, (t-T, t)}$ are from the digital behavioral fingerprint. By having a system that quantifies to what extent the value array is from the usual values, the system is aware of when the person might be changing his or her digital behavioral fingerprint. In order to update the array of values, the system requires a second level authentication when the authenticity score deviates too much or when the change in the digital factors is due to a change of behavior or due to a different person using the device. This situation is triggered when the difference between the digital factors of the period t−T to t($Z_{k, (t-T, t)}$) and the digital behavioral fingerprint at time t-T is greater than the soft threshold $D_{soft}$ but less than a harder threshold $D_{hard}$.

The novel system automatically captures changes in behavior and changes in the corresponding digital behavioral fingerprint. Importantly, through an automatic authentication process (which includes the potential prompt of the "second level authentication") the invention ensures the validity of captured data (i.e., that it is coming from the expected user) and correspondingly updates the knowledge base with the trajectories in behavior and digital behavioral fingerprint changes that have been observed in the historical usage of the system. In this way, the novel system can build the knowledge about "normal" (i.e., expected) user behavior in real-life and with the App, and signal when the pattern becomes abnormal to either discard the data (because the user was not authenticated or tried to misuse the system) or to update the database with the newly observed behavior that should be stored in the database of expected behavior.

Figure 5:
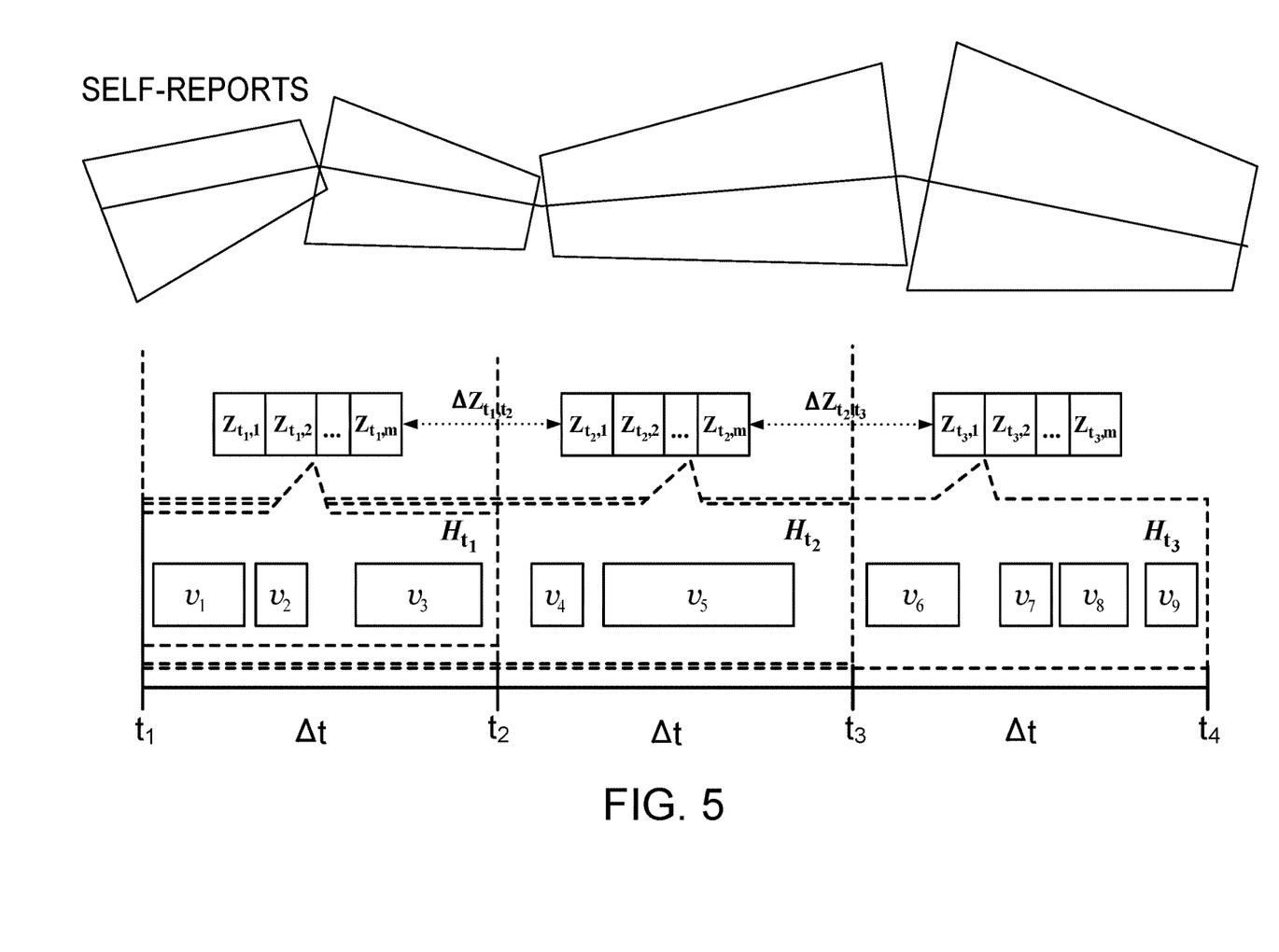
FIG. 5 is an example of mapping between specific values of digital factors and corresponding expected active data (self-reports) with an acceptance margin.

In a similar way, this concept is also applied to validate the active data (self-reports as illustrated in FIG. 5) provided by the user (e.g., reporting on mental health symptoms, feelings, wellbeing, behavioral problems e.g., with sleep, social interactions, etc.). The system performs the validation by building a database of the mapping between historical second data of other users and digital behavioral fingerprints.

Behavior can be determined not to correspond to active data as per the historical records. This can be determined by comparing previous theoretical findings or the correspondence between similar cases by other users e.g., if a person has very atypical behavior, lack of social interactions, bad sleep, or spends too much time at home it is unlikely that his/her self-reports of wellbeing are very high. To check the validity of the active data, a conformity score between the expressed behavior (in form of digital factors) and the self-reported value is constructed. This conformity score is analogous to the authenticity score and can be described in similar terms. In this case, a mapping between the digital factors and the expected active data is constructed using historical data from other users. This expected active data is then compared with the actual active data from the user. The conformity score is computed as the difference between the expected active data and the actual active data. If this conformity score is within an acceptance margin, the active data is considered valid, and there is no need to intervene. Alternatively, when the conformity score is above that threshold, the validity of the active data is considered to be invalid and the system signals it. Then, the user is required to do an extra step depending on the service provided. Examples of this extra step are answering a different questionnaire or an in-person assessment (e.g., with a therapist) to confirm the previous inputs, i.e., a mental state.

Figure 6:
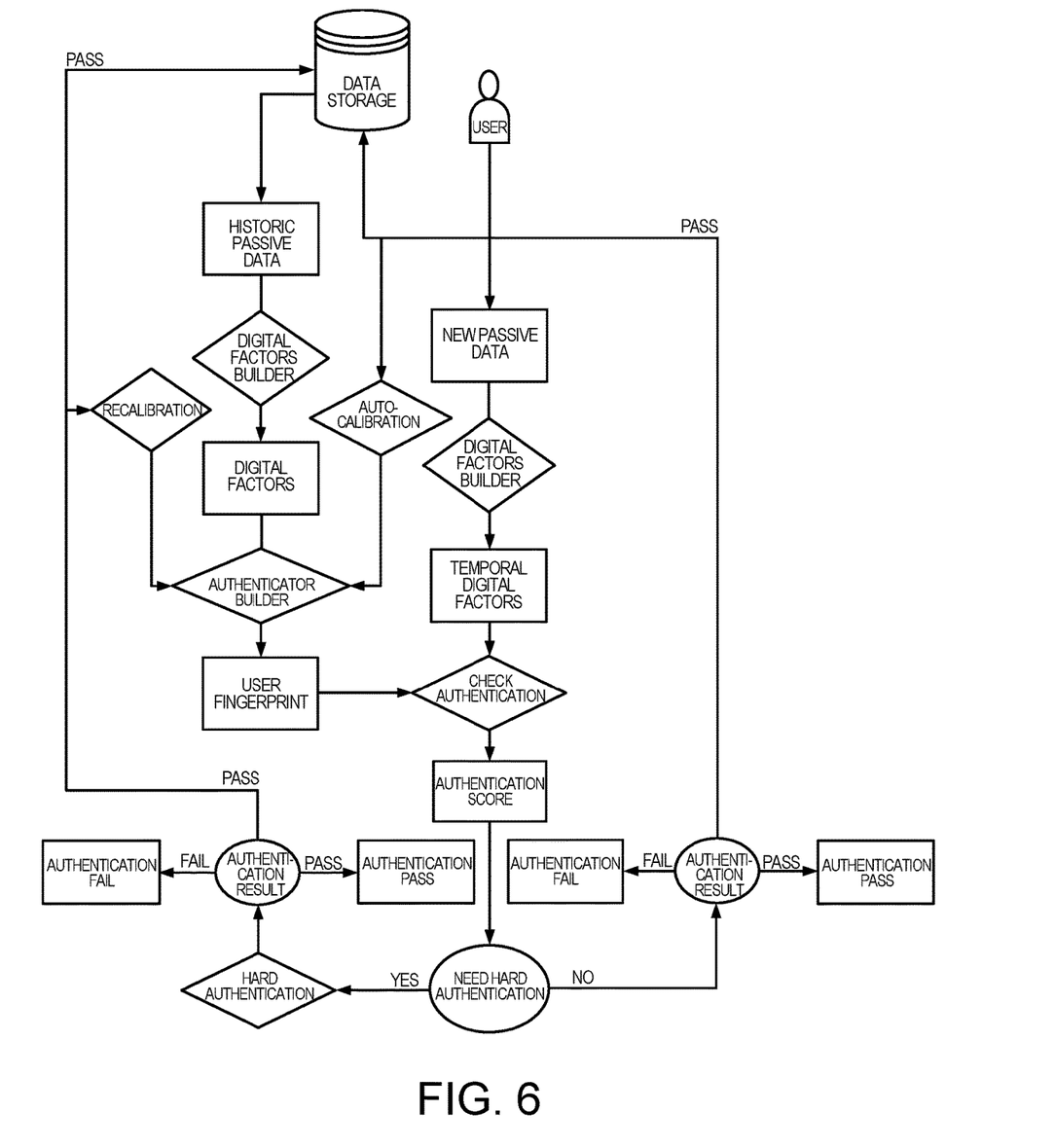
FIG. 6 is a general overview of the different processes/steps that can be executed by the present invention to validate a user.

FIG. 6 illustrates an example of all the different processes/steps that are executed by the novel method to validate a user.

When a significant behavior change has been detected and the system is no longer certain about the identity of the user based on the acquired authentication model, a second level authentication is required. This can be performed, for instance, using a face detection prove and/or by using the user's physical fingerprint. It should be noted that other biometric proofs of the user can also be used. The second level authentication has two possible outcomes: pass or fail. If the second level authentication passes, the system assumes that the individual using the portable computer device is the expected user, and thus it needs to recalibrate the digital behavioral fingerprint according to the last observations. The recalibration involves assigning a higher weight to the more recent digital factors. In this way, if the user continues to show the same new behavior, the system will successfully indicate that it belongs to the actual user.

Various aspects of the novel method may be embodied in programming. Computer program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at anytime for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution. Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

The present disclosure and/or some other examples have been described in the above. According to the description above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure.

What is claimed is:

1. A computer-implemented method for validating a user, comprising:
receiving, by one or more processors, current first data associated with the user that is passively acquired by one or more sensors of a portable computer device of the user, wherein the current first data is acquired during a plurality of predetermined time intervals;
receiving, by the one or more processors in response to a prompt, current second data directly input by the user into the portable computer device;
generating, by the one or more processors, a digital behavioral fingerprint of the user by processing the current first data;
determining, by the one or more processors, whether a purported identity of the user is authentic by computing, by the one or more processors, an authenticity score using the digital behavioral fingerprint, wherein the purported identity of the user is determined to be authentic if the authenticity score is less than or equal to a first threshold of identity, and wherein the purported identity of the user is determined to be potentially not authentic if the authenticity score is greater than the first threshold of identity;
determining, by the one or more processors, whether the current second data directly input by the user is invalid by computing, by the one or more processors, a conformity score if the purported identity of the user is determined to be potentially not authentic, wherein the conformity score is a measure of a difference between the received current second data and an expected current second data, wherein the expected current second data is based on (i) prior second data directly input by the user in response to the prompt that was received prior to the plurality of predetermined time intervals, (ii) prior second data directly input by other users in response to the prompt, and (iii) one or more prior correspondences between prior first data and the prior second data from the user and between prior first data and the prior second data from other users acquired prior to the plurality of predetermined time intervals, wherein the current second data directly input by the user is determined to be not invalid if the conformity score is less than or equal to a second threshold of identity, and wherein the current second data directly input by the user is determined to be invalid if the conformity score is greater than the second threshold of identity; and
providing, by the one or more processors, user access to a service if either the purported identity of the user is determined to be authentic or the current second data associated with the user is determined to be not invalid, wherein the service is personalized based in part on correlating, by the one or more processors, the current first data associated with the user with the current second data directly input by the user.

2. The method of claim 1, wherein the service is a cognitive behavioral therapy treatment.

3. The method of claim 1, wherein the current first data associated with the user includes data selected from the group consisting of: data regarding movement acquired by an accelerometer of the portable computer device of the user, data about when a screen of the portable computer device was on and off, data about when the portable computer device was locked and unlocked, data describing finger swiping patterns on the portable computer device, data about when a mobile app installed on the portable computer device was used, data on sleep characteristics of the user, and data describing background noise sensed by the portable computer device.

4. The method of claim 1, wherein the digital behavioral fingerprint is based on information selected from the group consisting of: gait patterns of the user, a typical route traveled by the user, a typical routine undertaken by the user, and a regular sleep pattern of the user.

5. The method of claim 1, wherein the current first data acquired during the plurality of predetermined time intervals is stored, by the one or more processors, in a database as a record for later retrieval.

6. The method of claim 1, wherein the purported identity of the user is determined to be authentic by computing, by the one or more processors, the authenticity score using the digital behavioral fingerprint and a calibrated digital behavioral fingerprint computed based on the prior first data associated with the user that was received prior to the plurality of predetermined time intervals, and wherein if the purported identity of the user is determined to be authentic, recalibrating, by the one or more processors, the calibrated digital behavioral fingerprint with the digital behavioral fingerprint computed using the current first data acquired during the plurality of predetermined time intervals.

7. The method of claim 1, wherein the current second data directly input by the user includes biometric data selected from the group consisting of: a facial scan of the user, and a physical fingerprint of the user.

8. The method of claim 1, further comprising:
storing, by the one or more processors, the current first data together with timestamps indicating when the current first data was acquired, wherein the digital behavioral fingerprint is generated using only the current first data having timestamps during a particular predetermined time interval.

9. The method of claim 1, wherein the current second data that is directly input by the user is taken from the group consisting of: an answer to a health questionnaire, an answer to a survey question, and a rating of a user experience of having visited a restaurant.

10. The method of claim 1, wherein the portable computer device of the user is taken from the group consisting of: a smartphone, a smartwatch, a smart scale, a blood pressure sensor and a temperature sensor.

11. The method of claim 8, wherein the particular predetermined time interval covers at least twelve hours, twenty-four hours, five days or seven days from a current time at which the user is allowed access to the service.

12. A system for validating a user, comprising:
a portable computer device of a user having a sensor; and
a computer including a memory and a processor, wherein the processor is configured to:
receive current first data associated with the user that is passively acquired using the sensor, wherein the current first data is acquired during a plurality of predetermined time intervals;
receive, in response to a prompt, current second data directly input by into the portable computer device;
generate a digital behavioral fingerprint of the user by processing the current first data;
determine whether a purported identity of the user is authentic by computing an authenticity score using the digital behavioral fingerprint, wherein the purported identity of the user is determined to be authentic if the authenticity score is less than or equal to a first threshold of identity, and wherein the purported identity of the user is determined to be potentially not authentic if the authenticity score is greater than the first threshold of identity;
determine whether the current second data directly input by the user is invalid by computing a conformity score if the purported identity of the user is determined to be potentially not authentic, wherein the conformity score is a measure of a difference between the received current second data and an expected current second data, wherein the expected current second data is based on (i) prior second data directly input by the user in response to the prompt that was received prior to the plurality of predetermined time intervals, (ii) prior second data directly input by other users in response to the prompt, and (iii) prior correspondence between prior first data and the prior second data from the user and between prior first data and the prior second data from other users acquired prior to the plurality of predetermined time intervals, wherein the current second data directly input by the user is determined to be not invalid if the conformity score is less than or equal to a second threshold of identity, and wherein the current second data directly input by the user is determined to be invalid if the conformity score is greater than the second threshold of identity; and
provide user access to a service if either the purported identity of the user is determined to be authentic or the current second data directly input by the user is determined to be not invalid, wherein the service is personalized based in part on correlating the current first data associated with the user with the current second data directly input by the user.

13. The system of claim 12, wherein the service is a cognitive behavioral therapy treatment.

14. The system of claim 12, wherein the current first data associated with the user includes data selected from the group consisting of: data regarding movement acquired by an accelerometer of the portable computer device of the user, data about when a screen of the portable computer device was on and off, data about when the portable computer device was locked and unlocked, data describing finger swiping patterns on the portable computer device, data about when a mobile app installed on the portable computer device was used, data on sleep characteristics of the user, and data describing background noise sensed by the portable computer device.

15. The system of claim 12, wherein the portable computer device of the user is selected from the group consisting of: a smartphone, a smartwatch, and a fitness tracker.

16. A computer-implemented method comprising:
receiving, by one or more processors, current first data associated with a user that is acquired during a predetermined time period by a sensor of a portable computer device of the user;
receiving, by the one or more processors in response to a prompt, current second data directly input by into the portable computer device;
generating, by the one or more processors, a digital behavioral fingerprint of the user using the current first data;
determining, by the one or more processors, that a purported identity of the user is authentic if the digital behavioral fingerprint does not exceed a first threshold, wherein the purported identity of the user is determined to be potentially not authentic if the digital behavioral fingerprint exceeds the first threshold;
if the purported identity of the user is determined to be potentially not authentic, determining, by the one or more processors, that the current second data directly input by the user is invalid if a measured difference between the received current second data and an expected current second data exceeds a second threshold, wherein the expected current second data is based on (i) prior second data directly input by the user in response to the prompt that was received prior to the predetermined time period, (ii) prior second data directly input by other users in response to the prompt, and (iii) prior correspondence between prior first data and the prior second data from the user and between prior first data and the prior second data from other users acquired prior to the predetermined time period, wherein the current second data directly input by the user is determined to be not invalid if the difference between the received current second data and the expected current second data does not exceed the second threshold; and
providing, by the one or more processors, user access to a service if either the purported identity of the user is determined to be authentic or the current second data directly input by the user is determined to be not invalid, wherein the service is personalized based in part on correlating, by the one or more processors, the current first data associated with the user with the current second data directly input by the user.

17. The method of claim 16, wherein the sensor is an accelerometer, wherein the current first data is speed data, and wherein the digital behavioral fingerprint involves gait patterns of the user.

18. The method of claim 16, wherein the current first data relates to swiping patterns on the portable computer device by the user, and wherein the digital behavioral fingerprint involves a typical daily routine of the user.

* * * * *